G. MARSHALL.

Improvement in Harness-Saddles.

No. 5,101. Reissued Oct. 15, 1872.

Witness:

Henry A. Miller

C. L. Euert.

Inventor.

Godfrey Marshall.

per Fauder Vleeson

Attorneys.

AM. PHOTO-LITHOGRAPHIC CO. N.Y. (OSBORNE'S PROCESS.)

UNITED STATES PATENT OFFICE.

GODFREY MARSHALL, OF INDIANA, PENNSYLVANIA.

IMPROVEMENT IN HARNESS-SADDLES.

Specification forming part of Letters Patent No. 70,589, dated November 5, 1867; reissue No. 5,101, dated October 15, 1872.

*To all whom it may concern:*

Be it known that I, GODFREY MARSHALL, of Indiana, in the county of Indiana and State of Pennsylvania, have invented certain new and useful Improvements in Saddles; and do hereby declare the following to be a full, clear, and exact description thereof, reference being had to the accompanying drawing and to the letters of reference marked thereon.

The present invention relates to the saddles of harness more particularly; and consists in making the top or frame to the saddle in one piece, having a raised flange or lip around its sides or edges upon its back or under side, said flange or lip extending, at each end, beyond the top or frame, and with a cross-bar to receive the belly-bands, and between such lips placing the cushion or pad, made of the proper shape and provided with screw-nuts, in proper position for receiving the terret-rings, screw-shanks, and other screw-bolts, by means of which the pad is secured to the frame, at the same time also fastening the saddle-straps.

In order to enable others skilled in the art to which my invention appertains to make and use the same, I will now proceed to describe its construction and operation, referring to the annexed drawing which forms a part of this specification, and in which—

Figure 1:
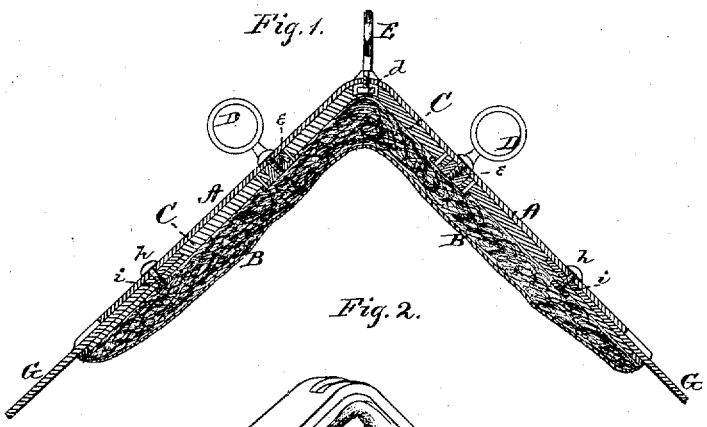
Figure 2:
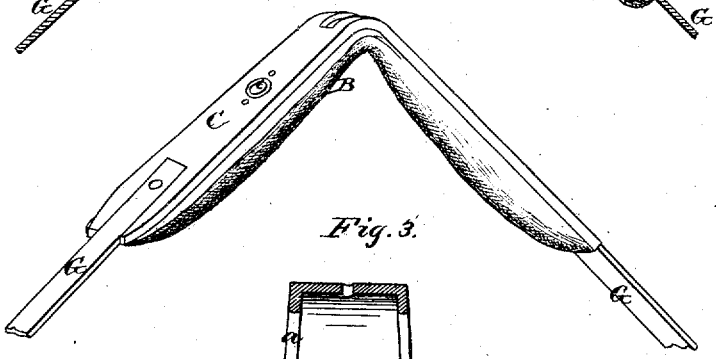
Figure 3:
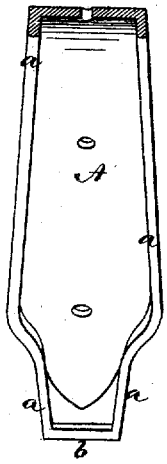

Figure 1 is a longitudinal section through my harness-saddle; Fig. 2 is a perspective view of the cushion or pad; and Fig. 3 is a cross-section of the frame.

A represents the top or frame of the saddle, cast of one piece of iron, or other suitable metal, and provided along its sides or edges with a lip or flange, *a*, projecting on its under side. This piece A is embossed, japanned, or otherwise ornamented to represent leather or other material, so as to give a neat and finished appearance to the outer surface, so that covering of any kind is dispensed with. This lip or flange extends about one inch beyond each end of the frame A, and the flanges on the two sides of the frame are at each end connected by a cross-bar, *b*, to which the belly-bands are to be fastened. B represents the cushion or pad, the top of which is formed of or provided with a strap, C, of such size as to fit in between the lips or flanges *a* on the under side of the frame, the said lips or flanges bearing against the pad, which extends to or beyond the edges of the frame as desired. In the center of the strap C is a hole, cut for the reception of the nut *d*, into which the check-hook E is screwed, as shown in Fig. 1. A suitable distance from the center, on each side of the strap C, is a nut, *e*, passed through a hole in the strap, and having a projecting flange at its inner end which bears against the under side of the strap, and is riveted to it, the outer end of the nut being flush with the outer surface of the strap. Into these nuts the screw-shanks of the terret-rings D D are screwed from the outside of the frame, thus fastening said rings, and also the pad, to the frame. Other nuts *i i* are also placed in or under the strap C, into which screw suitable screws *h h* to further fasten the the pad to the frame. These screws *h h* also pass through and fasten the saddle-straps G G, which are sunk into the ends of the strap C, as shown in Figs. 1 and 2.

Having thus fully described my invention, what I claim as new, and desire to secure by Letters Patent, is—

1. A coach-pad top or frame, A, without exterior covering, formed of one piece of cast metal, with downward-projecting lips or flanges on its edges to receive the pad, substantially as herein set forth.

2. The lips or flanges *a* extending along the sides or edges of the top or frame A, and beyond the ends of the same, their extreme ends being connected by cross-bars *b b*, substantially as and for the purposes herein set forth.

3. The combination of the frame A, pad B with strap C, flanged nut *e*, and terret-ring D, substantially as and for the purposes herein set forth.

4. The combination of the frame A, pad B, with strap C, nut *i*, saddle-strap G, and screw *h*, substantially as and for the purposes herein set forth.

In testimony that I claim the foregoing I have hereunto set my hand this 15th day of August, 1872.

GODFREY MARSHALL.

Witnesses:

C. L. EVERT,

A. N. MARR.